March 29, 1932.  A. G. HALL  1,851,173
METHOD OF AND APPARATUS FOR GAUGING ARTICLES
Filed Sept. 7, 1928
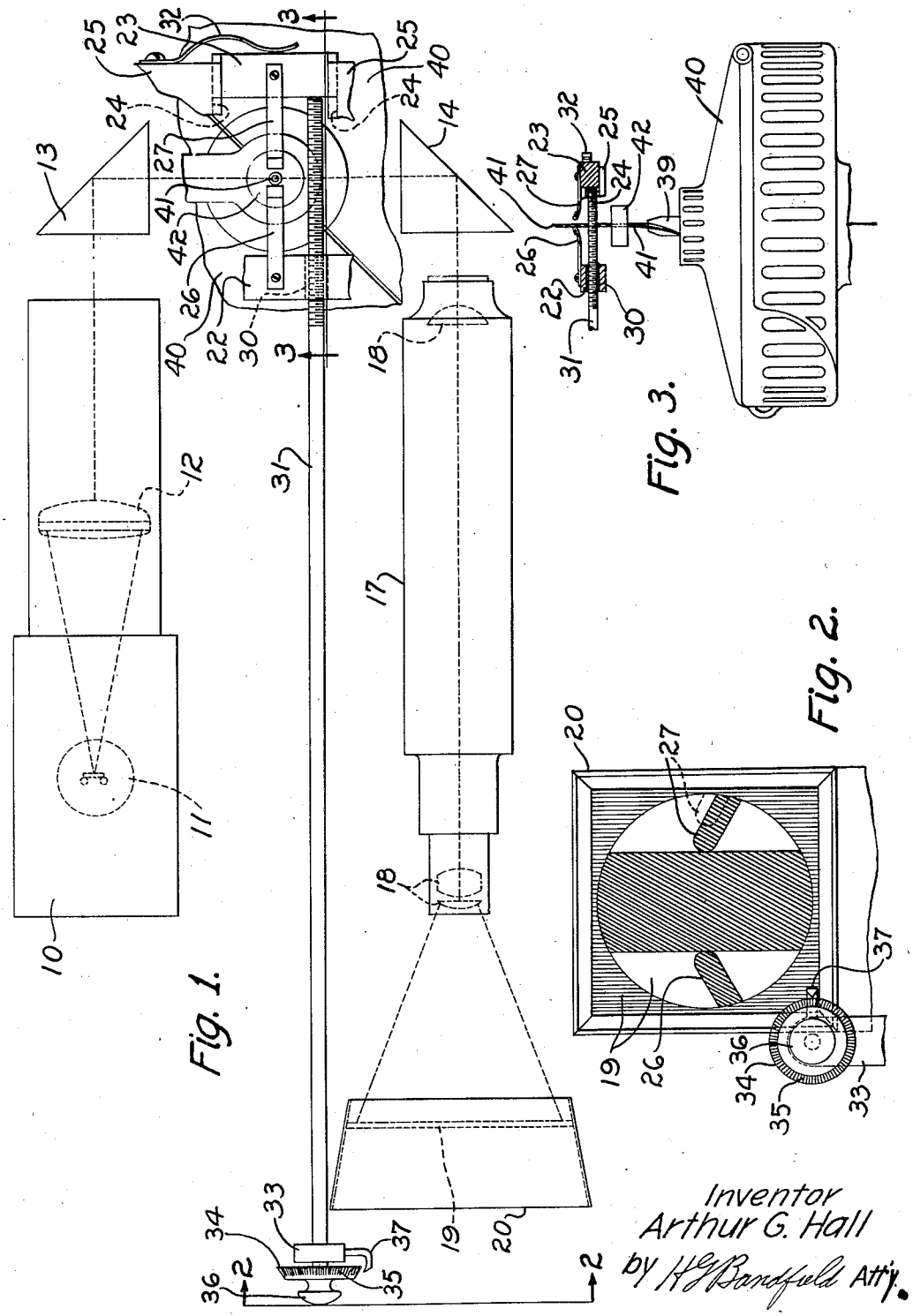
Inventor
Arthur G. Hall
by H. G. Bandfield Atty.

Patented Mar. 29, 1932

1,851,173

UNITED STATES PATENT OFFICE

ARTHUR GILLESPIE HALL, OF CHICAGO, ILLINOIS, ASSIGNOR TO BELL TELEPHONE LABORATORIES, INCORPORATED, OF NEW YORK, N. Y., A CORPORATION OF NEW YORK

METHOD OF AND APPARATUS FOR GAUGING ARTICLES

Application filed September 7, 1928. Serial No. 304,585.

This invention relates to methods of and apparatus for gauging articles, and more particularly to methods of and apparatus involving optical systems for determining the dimensions of articles.

This invention has been found particularly useful in determining the diameter of paper insulated conductors, such as are used in the manufacture of multi-conductor cables for use in the telephonic transmission of intelligence. Telephone cable conductors are generally insulated with comparatively easily compressible material, such as paper ribbon formed with a folded edge at one side thereof to provide an air space for insulating purposes, or with a homogeneous coating of pulp or other insulating material. The mutual capacitance of the circuits of the cable is governed by the space occupied by a circuit and therefore it is necessary to control the diameter of the cables to close limits, which will vary with the number of conductors therein. Therefore, it is necessary to provide individual insulated conductors having a predetermined diameter so that upon subsequent formation into a cable of a specified number of circuits the diameter thereof will come within the specified limits.

Difficulty has been experienced in obtaining a satisfactory determination of the diameter thereof by the use of available gauging apparatus, since the results obtained therefrom generally depend on the tension of springs acting on jaws which close on the insulated conductor during the gauging thereof and the insulation being easily compressible gives an indicator reading which is indefinitely lower than the actual diameter. Other undesirable factors which require the exercise of considerable care to obtain accurate results are the introduction of personal error which enters into the ordinary methods of diameter gauging of easily compressible insulating material and the possibility of deforming the insulating material which might tend to deleteriously affect the insulating properties thereof.

The primary objects of this invention are to provide an improved method of and apparatus for accurately gauging in a facile manner dimensions of articles.

In order to attain these and other objects in accordance with the general features of this invention, an apparatus by means of which the improved method may be practiced for gauging dimensions of articles, such as paper insulated electrical conductors, is provided which comprises means for directing a beam of light into the path of such a conductor as it emerges from the insulating machine without a pair of jaws disposed at opposite points of the conductor at right angles to the path of the beam, one of the jaws being controlled by a movable member of an indicating gauge. By means of a system of lenses a magnified image of the conductor with the jaws at either side thereof is projected onto a screen and when both jaws have been brought into engagement with the conductor, which movement is clearly pictured on the screen by the beam being interrupted at opposite points of the conductor, the distance between the points at which the beam was interrupted or the gauged dimension, namely, the diameter of the insulated conductor, may be read directly on the gauge.

Other objects and advantages of this invention will more fully appear from the following detailed description taken in connection with the accompanying drawings, in which Fig. 1 is a diagrammatic fragmentary plan view of an optical system embodying the features of this invention as applied to diameter gauging of paper insulated electrical conductors as they emerge from an insulating machine, shown fragmentarily;

Fig. 2 is a fragmentary front view taken on the line 2—2 thereof showing the screen and the magnified image of the conductor and the gauge jaws at opposite points thereof, and Fig. 3 is a fragmentary vertical section, upon a reduced scale, taken on the line 3—3 of Fig. 1, and illustrating a portion of the insulating machine.

Referring now to the drawings in detail wherein like reference numerals indicate similar parts throughout the several views, and particularly to Fig. 1, which diagrammatically illustrates the optical system, a housing 10 contains a lamp 11 for emitting a beam of light of high intensity. The light beam passes from the housing 10 through a condensing lens 12 and strikes a prism 13 where it is deflected 90° onto a prism 14 which in turn deflects the beam 90° into a path parallel to but in a direction reverse to the path of the beam in passing from the lamp 11 to the prism 13. The light beam in being deflected from the prism 14 passes through a projector 17 having a plurality of lenses 18 for projecting a magnified image to be presently described upon a screen 19 mounted in a housing 20 adapted to shield the screen from external direct lighting, so that the projected image will be clearly revealed upon the screen.

The optical system hereinbefore described is mounted on a common base (not shown) and in the particular application thereof may be arranged as a portable apparatus so that it may be moved from one conductor insulating machine to another for determining the diameter of the insulated conductor passing from a particular machine. Also mounted upon the base between the prisms 13 and 14 are stationary and adjustable gauge blocks 22 and 23, respectively, the adjustable block 23 being slidably mounted on horizontal ways 24 formed on stationary members 25 fixed to the base. Attached to the upper surface of each of the gauge blocks 22 and 23 are very flexible gauge jaws or fingers 26 and 27, respectively, which are positioned midway of the prisms 13 and 14, and directly opposite each other and extending at right angles to the beam of light passing between the prisms. Threaded into a depending lug 30 formed on the stationary gauge block 22, at one side of the fingers 26 and 27, is a rod 31 provided with micrometer screw threads, the right hand end of the rod (Figs. 1 and 2) engaging the inner vertical surface of the adjustable gauge block 23. The block 23 which is slidable on the ways 24 is maintained in engagement with the end of the rod 31 by means of a leaf spring 32 pivotally mounted at one end upon the stationary member 25. The left end of the rod 31 is journaled in a bearing standard 33 (Figs. 1 and 2) and carries at its extreme left end a dial 34 provided with a micrometer scale 35 and a handle 36, the dial in cooperation with an indicating pointer 37 fixed in the standard 33 and the micrometer threads on the rod 31 provides means whereby the distance apart of the gauge fingers 26 and 27 can be measured to one thousandths of an inch.

One type of paper insulating machine used for insulating telephone cable conductors with paper ribbon, which type of insulated conductor has hereinbefore been described, is shown and described in Patent No. 1,654,524, dated January 3, 1928, to H. J. Boe.

In Fig. 3 of the drawings a fragmentary view of a paper insulating machine of the type disclosed in the referred to patent is illustrated wherein the upper end of a rotating serving mechanism 39 projects from a housing 40. An insulated conductor 41 emerges from the mechanism 39 and passes vertically upwardly through a well known form of stationary polisher or compacter 42 and thence to a take-up mechanism (not shown). The diameter of the insulated conductor 41 is gauged as it emerges from the machine and just after it passes through the compacter 42 and to position the gauging apparatus herein described in operative relation with the vertically moving conductor the spring 32 is swung about its pivot out of the path of the adjustable gauge block 23 supporting the finger 27, which is then removed by hand from its supporting ways 24, thus permitting the finger 26 to be brought into engagement with one side of and centered with the traveling insulated conductor by a movement of the gauging apparatus, the conductor at this time being centered with respect to the opposed faces of the prisms 13 and 14, as clearly shown in Fig. 1. The gauge block 23 is then mounted on the ways 24, the rod 31 being so adjusted that when the block is brought into engagement with the inner end thereof that the gauge finger 27 carried by the block is spaced from the conductor to provide a clear opening therebetween, as clearly shown in Figs. 1 and 3, and in dotted outline in magnified form in Fig. 2. With the gauging apparatus thus positioned with respect to the insulated conductor 41 the light 11 of the optical system is turned on and the beam of light passes horizontally from the prism 13 to the prism 14 into the path of the conductor passing vertically between the gauge fingers 26 and 27 and is broken or interrupted thereby, thus producing an image of the conductor and the fingers upon the prism 14.

The image of the conductor 41 with the fingers 26 and 27 disposed at opposite points thereof is reflected by the prism 14 into the lenses 18 of the projector 17 and a magnified image is thus revealed on the screen 19 with the finger 26 engaging the conductor and interrupting the beam at one side thereof with the oppositely disposed finger 27 spaced from the conductor and permitting the beam to pass therebetween. This magnified image is clearly illustrated in Fig. 2 with the finger 27 indicated in dotted outline spaced at this time from the conductor 41. The operator then proceeds to rotate the dial 34 by means of the handle 36 in a direction which will permit the gauge block 23 to move inwardly toward the conductor 41, through the action of the spring 32 until the gauge finger 27 carried by the block interrupts the beam at the opposite side of the conductor. Immediately upon both fingers 26 and 27 being brought into engagement with opposite points of the conductor and in consequence of this engagement the interruption of the beam at opposite sides of the conductor, which is clearly pictured on the screen (Fig. 2), the operator ceases to rotate the dial 34. The distance between the points of the conductor 41 at which the beam was interrupted or the gauged diameter of the insulated conductor between these points may then be determined by a direct reading of the dial 34 of the indicating gauge.

From the foregoing description it will be apparent that means is provided for accurately gauging the diameter of conductors insulated with easily compressible insulating material in a facile manner and without deleteriously affecting the insulating material or the conductor since no appreciable pressure is exerted on the insulated conductor 41 by the very flexible fingers 26 and 27.

Although the invention as herein illustrated and described is particularly well adapted for use in connection with the diameter gauging of insulated conductors emerging in a vertical direction from a paper insulating machine of the type herein referred to, it should be understood that the novel features thereof are capable of being applied to the gauging of conductors traveling horizontally or at various angles, or of other applications and should be limited only by the scope of the appended claims.

What is claimed is:

1. The method of gauging an easily compressible article, which consists in positioning an article in a beam of light and between adjustable members of an indicating gauge and imaging the article and the members on a screen, adjusting the members until the beam is interrupted at opposite points of the article as imaged on the screen, and then reading the gauge for the dimension of the article between the points at which the beam was interrupted.

2. The method of gauging dimensions of articles, which consists in positioning an article in a beam of light and between micrometer gauge jaws, producing an enlarged image of said jaws and the article to be gauged on a screen, adjusting the jaws until they contact with opposite points of the article and cause the beam to be interrupted thereat as indicated on said screen, and then reading the micrometer scale for a direct indication of the dimension of the article between the points at which the beam was interrupted.

3. The method of gauging dimensions of articles, which consists in positioning an article in a beam of light focused on a screen and between micrometer gauge jaws, the article and the jaws being imaged on the screen, adjusting the jaws until they contact, as imaged on the screen, with opposite points of the article and cause the beam to be interrupted thereat, and then reading the micrometer scale for a direct indication of the dimension of the article between the points at which beam was interrupted.

4. The method of gauging the diameter of traveling conductors insulated with easily compressible material, which consists in causing the conductor to travel in a predetermined path through a beam of light and between adjustable members, producing an enlarged image of said traveling conductor and adjustable members on a screen, adjusting the members until the beam as indicated on said screen is interrupted at opposite points of the traveling conductors without compressing the insulation thereof, to indicate that the members are engaging the conductors, and then determining the relative positions of the members to gauge the diameter of the conductor.

5. In an apparatus for gauging dimensions of articles, members engageable with an article to be gauged at a plurality of points, means for producing separated enlarged images of the article between the members, means for receiving the enlarged images for observance, means for causing a relative movement of the members and the article, and a corresponding relative movement of the images until the same interengage as observed upon the image receiving means, and means operable therewith for directly indicating the distance between the members and thereby the dimension of the article between the engaged points thereof.

6. In an apparatus for gauging dimensions of articles, means for producing a beam of light, an article to be gauged positioned in the beam of light, a screen upon which an enlarged image of an article placed in the beam of light is produced, an indicating gauge, and means positioned at opposite points of the article at right angles to the path of the beam and controlled by a movable member of the gauge for engaging the means with the article to cause the beam to be interrupted at opposite points of the article as indicated by the enlarged image on said screen, the distance between the points at which the beam was interrupted or the gauged dimension of the article being indicated on the gauge.

7. In an apparatus for gauging dimensions of articles, means for producing a beam of light, an article to be gauged positioned in the beam of light, an indicating gauge, members positioned at opposite points of the article and at right angles to the path of the beam, means for controlling one of the members engaging the article to cause the beam to be interrupted at opposite points of the article, a system of lenses for projecting a magnified image of the article and the members, and a screen for receiving the image, the distance between the points at which the beam was interrupted by both members or the gauged dimension of the article being indicated directly on the gauge upon the engagement of both members with the article.

In witness whereof, I hereunto subscribe my name this 10th day of August A. D., 1928.

ARTHUR GILLESPIE HALL.